United States Patent

[11] 3,569,856

[72] Inventor Stuart L. Ridgway
 Princeton, N.J.
[21] Appl. No. 704,044
[22] Filed Feb. 8, 1968
[45] Patented Mar. 9, 1971
[73] Assignee TRW Inc.
 Redondo Beach, Calif.

[54] LASER FREQUENCY MODULATING SYSTEM
 4 Claims, 5 Drawing Figs.
[52] U.S. Cl................................................. 331/94.5,
 350/160
[51] Int. Cl................................................. H01s 3/10
[50] Field of Search........................................ 331/94.5;
 350/160

[56] References Cited
UNITED STATES PATENTS
| 3,177,770 | 4/1965 | Okaya | 350/160 |
| 3,243,722 | 3/1966 | Billings | 331/94.5 |
| 3,248,660 | 4/1966 | Fajans | 330/4.3 |
| 3,367,733 | 2/1968 | Grau | 350/160 |
| 3,464,025 | 8/1969 | Bell | 331/94.5 |

OTHER REFERENCES

Jenkins and White; Fundamentals of Optics, McGraw-Hill Book Company, Inc., New York, 1957, pp. 344— 47.

Evtuhov et al.: " Pulsed Ruby Lasers" , from Lasers, edited by Levine, vol. 1, Marcel Dekker, Inc. New York, 1966, pp. 119— 20

*Primary Examiner*—Ronald L. Wibert
*Assistant Examiner*—Edward S. Bauer
*Attorneys*—Daniel T. Anderson, Harry I. Jacobs and Gerald Singer ABSTRACT: The invention is directed to an optical laser of the Fabry-Perot resonant cavity type wherein at least one of the cavity reflectors is formed from an electro-optical material shaped as an echelon. An electric modulating field is applied to the electro-optical material by placing the material in a dielectric waveguide. The modulating field causes a proportional change in the optical path length of the resonant cavity which in turn frequency modulates the output of the optical laser.

Patented March 9, 1971

Stuart L. Ridgway
INVENTOR.

BY Edward Dugas
AGENT

Stuart L. Ridgway
INVENTOR.

BY Edward Dugas
AGENT

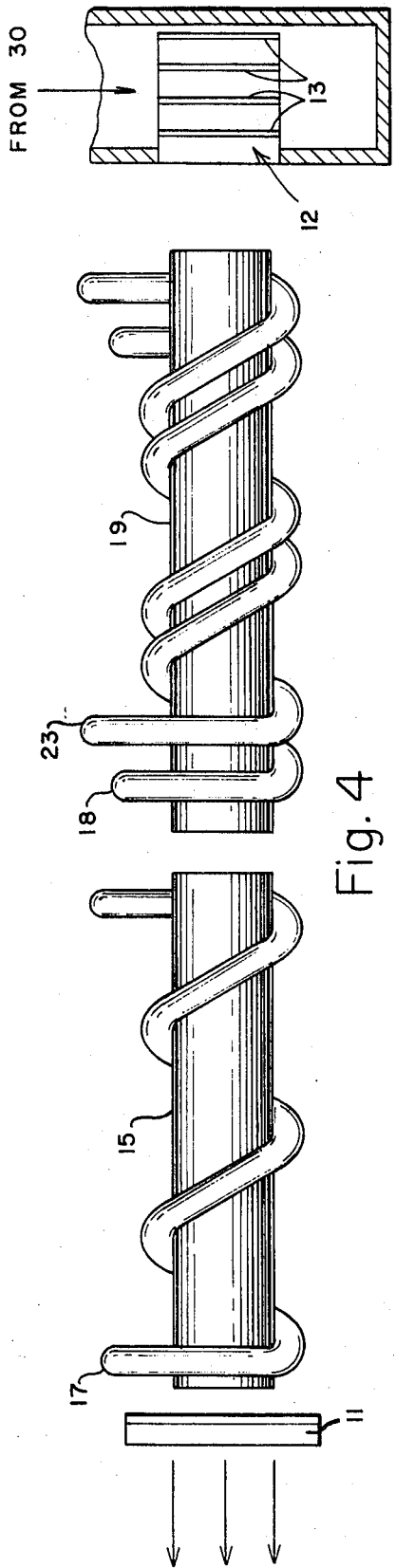
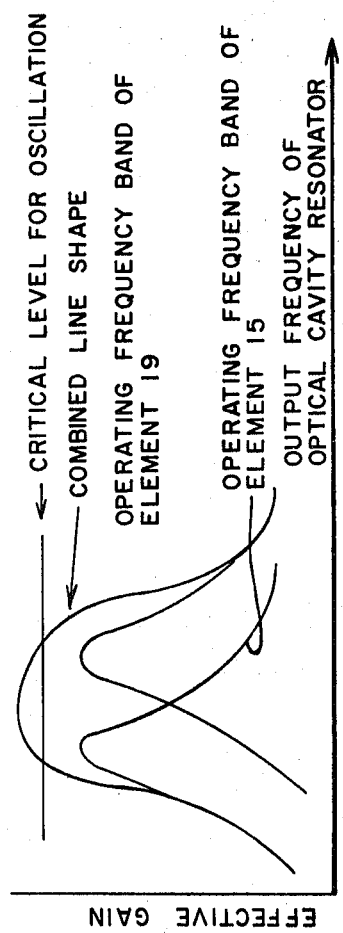
Fig. 4
Fig. 5
Stuart L. Ridgway
INVENTOR.
BY Edward Dugas
AGENT

LASER FREQUENCY MODULATING SYSTEM

BACKGROUND OF THE INVENTION

This invention relates generally to optical lasers and, more particularly, to an improved means for frequency modulating the output of an optical laser.

Various devices exist in the prior art for modulating the oscillation frequency of an optical laser. Modulation is generally accomplished by varying the distance between the plane parallel plate reflectors which make up the laser resonant cavity, which in turn changes the resonant frequency of the laser. Mechanical motion can be imparted to the reflectors with piezoelectric type devices to accomplish the modulation purpose. One of the difficulties encountered with this particular means is that for higher frequencies (for example, in the 10K megacycle range), the piezoelectric device cannot physically respond and therefore is ineffectual in imparting physical motion.

Other types of modulators have been used to increase the frequency; one such device utilizes the dielectric constant of either a Kerr cell or a crystal of ADP which is placed between the laser medium and one reflector. The optical path length between the reflector plates is varied by applying the modulating signal as a potential across the Kerr cell or ADP crystal. Variations in the index of refraction of the cell or crystal constitutes a variation in the effective optical path length between the reflector plates.

A problem that is associated with the standard Fabry-Perot optical laser cavity is that this type of cavity emits energy which is coupled into improper modes and which appears as undesirable noise in the laser output. Due to the very high frequency of the light rays and the requirement that a substantial quantity of active medium be included in the cavity, the separation of the reflectors is necessarily many thousands of wavelengths at the operating frequency. Hence, the cavity is inherently a multimode structure. For light rays parallel to the axis which is normally incident upon the reflective surfaces, resonant conditions may be considered to be obtained when the length of the cavity is an integral number of half-wavelengths. In addition to the axial modes, there also exist a number of off-axial cavity modes which are inclined at discrete small angles to the axis. Light rays which traverse paths such as these will walk off the reflectors after a certain number of reflections. However, if the angle to the axis is small, the number of reflections prior to walk-off will be quite large so that the light rays interact strongly with the active medium and thus will contribute to the output beam. The output power in the preferred fundamental or axial mode is somewhat diminished by the presence of these additional modes. It would therefore be highly advantageous to have a device which minimized these auxiliary modes while also providing a means of modulating the output frequency of the laser.

SUMMARY OF THE INVENTION

In a preferred embodiment of this invention, the optical laser is comprised of a pair of axially spaced reflectors defining an optical cavity resonator. One of the spaced reflectors is made from an electro-optical material which is shaped to form a Michaelson reflection echelon. The other reflector is partially transmissive to light wave energy in the operating frequency band of the active laser materials. An active laser material is disposed in the optical cavity and means for applying pump wave energy to the material is coupled to the laser material for causing the standard laser operation of the cavity. The Dielectric electro-optical echelon is positioned in a waveguide in which a modulating electrical field exists. The electric field of the waveguide interacts with the electro-optical material changing the optical path length in the electro-optical material and modulating the frequency of the laser optical waves. Optical waves which are not an integral number of two transits of an echelon step length are reflected from the cavity at an angle to the axis of the system. The echelon steps may be made reflecting with multilayer dielectric films. At microwave wavelengths, the dielectric films have no effect and thus allow the optical structure to appear simple to the microwave field. The echelon step reflector increases the Q of the resonant cavity while also providing frequency modulating of the output waves.

In a second embodiment of the invention, a second active laser material is interposed in the cavity in tandem with the first active material. Means are provided for shifting the frequency of the second active material a fixed amount with respect to the first active material. This results in a staggered tuned system (in a manner similar to the stagger tuning of I.F. amplifiers) that has a broadband which in turn enables a greater range of frequency modulation.

Accordingly, it is a primary object of the present invention to provide an improved optical laser cavity.

It is a further object of the present invention to provide an apparatus for modulating the frequency of an optical laser.

It is a further object of the present invention to provide an optical laser having substantially one predominant output mode which may be frequency modulated.

The foregoing and other objects and features of the present invention will become more apparent and better understood when taken in conjunction with the following description and accompanying drawings, throughout which like characters indicate like parts, and which drawings form a part of this application.

BRIEF DESCRIPTION OF THE DRAWINGS

FIG. 4 illustrates in schematic form a second embodiment of the invention; and

FIG. 5 illustrates a graph useful in the understanding of the operation of the embodiment illustrated in FIG. 4.

DESCRIPTION OF THE PREFERRED EMBODIMENT

Figure 1:
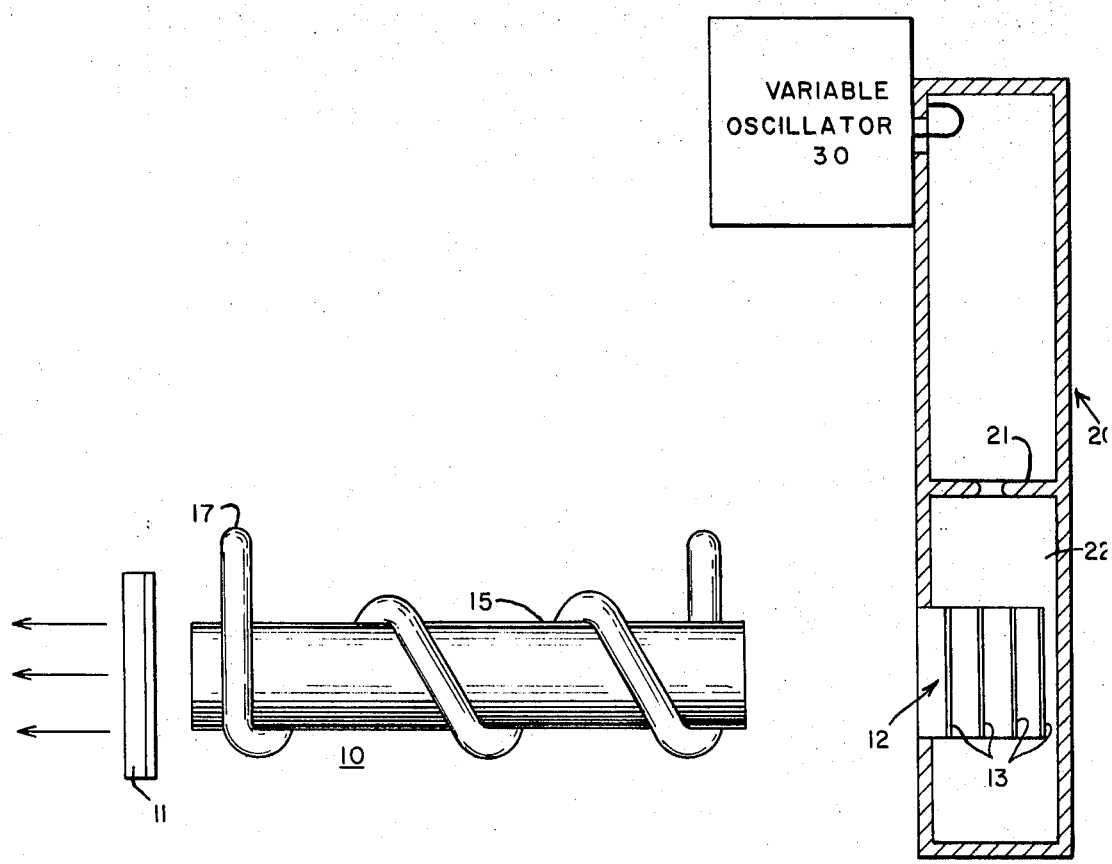
FIG. 1 illustrates in schematic form the preferred embodiment of the present invention.
Figure 2:
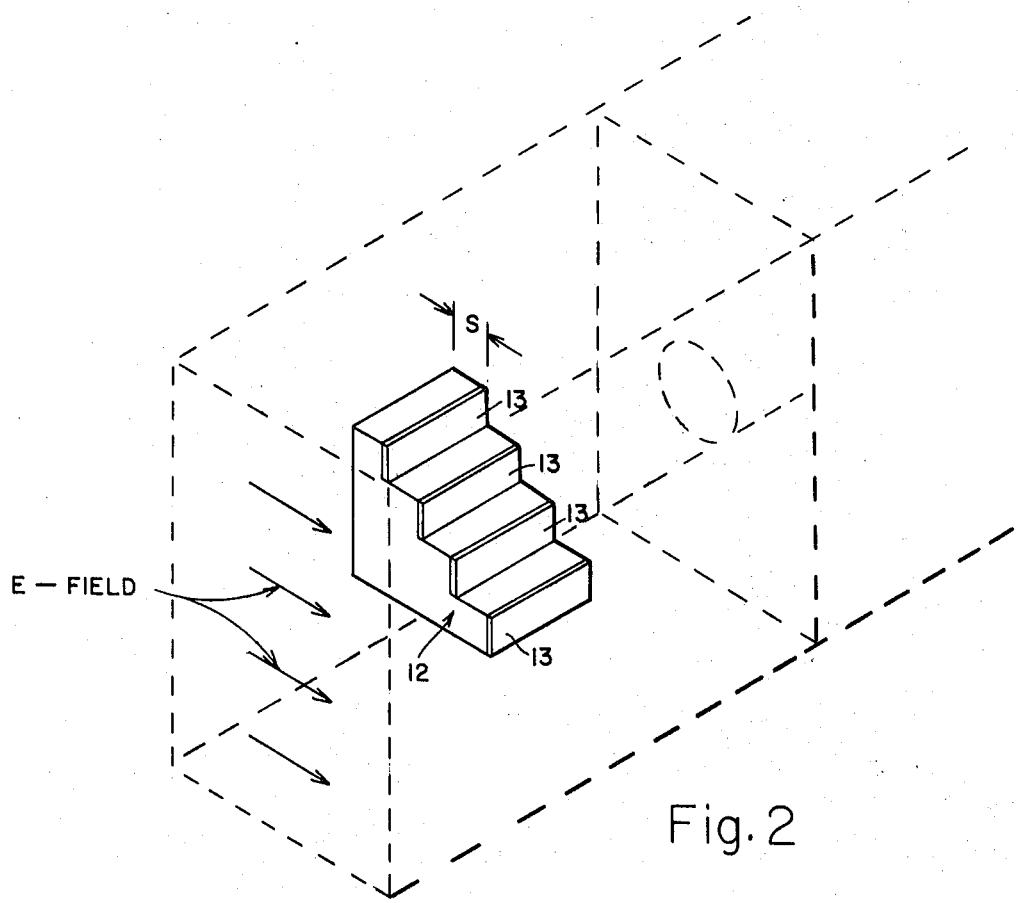
FIG. 2 illustrates in perspective view an enlarged portion of the embodiment illustrated in FIG. 1.

The optical laser 10 shown in FIGS. 1 and 2 comprises an optical cavity resonator defined by one flat parallel, partly reflective, surface 11 and a plurality of axially displaced reflectors 13. An active laser medium in the form of a rod 15 is disposed within the cavity between the reflectors 11 and 13.

Reflectors 13 are mounted to the raised (riser) surfaces of an electro-optical material, such as KDP, which is shaped as a Michaelson type reflector echelon to form an optical echelon 12.

Reflectors 11 and 13 are aligned to intercept the electromagnetic radiation from active laser medium 15 and to return it to the laser medium 15. The reflective surface of reflector 11 may be formed by evaporating thin films of silver or other reflective substances directly onto a flat plate by means well-known to those persons skilled in the art. Riser steps of the optical echelon 12 are coated with a dielectric multilayer reflecting material so as to form the reflectors 13. A lamp 17, connected to a power source (not shown) is arranged about the rod 15 for supplying pump wave energy thereto. Laser action is initiated when the pump power produces a population inversion in the energy level system of rod 15. Optical lasers employing the Fabry-perot interferometer as a resonant cavity are characterized by a number of resonant modes which tend to degrade the performance of the laser. By utilizing the Michaelson echelon reflector, it is possible to increase the Q of the laser resonant cavity by making each of the step lengths, S, an integral multiple distance of one-half the wavelength to be propagated by the cavity. By staggering the step lengths in integral multiples of the desired half wavelength to be transmitted, the undesired modes have their losses increased relative to the losses of the desired mode, thereby increasing the selectivity of the resonant cavity.

Modes that are slightly off-axis have their angle of deviation increased or accentuated by their passage through the echelon and are directed out of the cavity sooner than is possible with the flat parallel plane type reflector. The echelon step 12 itself is made from an electro-optical material, such as KDP crystal, so that the index of refraction, or the optical pathlength, through the crystal to each one of the reflectors 13 is different. By applying an electric field across opposite surfaces of the crystal, it is possible to vary the optical pathlengths through the crystal by well-known theory. The modulating E-field is applied to the electro-optical echelon 12 by immersing or placing the echelon in a dielectric waveguide operated in the $TE_{10}$ mode with a variable oscillator 30, providing the modulating E-field. The electric optical material projects partially through the wall of the waveguide 20 so that the optical energy from the laser rod 15 can pass through the optical material and be reflected from the reflectors 13. An iris 21 may be inserted into the waveguide 20 to provide a resonant cavity 22 which will decrease the power output requirement of the variable oscillator 30.

Figure 3:
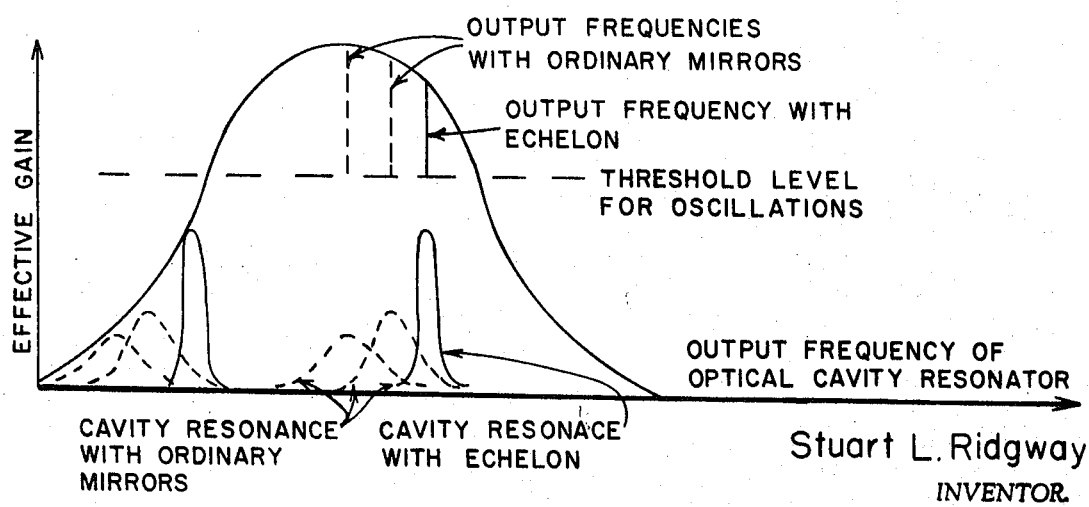
FIG. 3 illustrates a graph useful in the understanding of the operation of the preferred embodiment.

In FIG. 3, the optical gain of the laser cavity without the echelon and with plane parallel reflectors is shown superimposed on the optical gain achievable with the inclusion of the echelon as one of the reflectors. The cavity resonance frequency, with the use of the echelon, is designated $f_o$. By changing the optical pathlength of the resonant cavity, the oscillation frequency $f_o$ may be modulated a frequency of $\pm\Delta f$. The dotted lines indicate secondary modes.

Referring now to FIG. 4, the optical resonant cavity 40 is identical to the one illustrated in FIG. 1, with the addition of a second active laser material 19, inserted in the tandem with active material 15. A lamp 18, connected to a power source (not shown) is arranged about the rod 19 for supplying pump wave energy thereto. Laser action is initiated when the pump power produces a population inversion in the energy levels of rods 15 and 19. A second tube 23 is wound around rod 19. A cooling liquid or gas may be passed through tube 23 so as to maintain the operating temperature of rod 19 at a fixed differential temperature with respect to rod 15. The temperature difference between rods 15 and 19 cause the rods to have different operating frequency bands. By stagger tuning these bands (similar to I.F. stagger tuning) the overall (composite) band becomes quite broad, thereby increasing the range of frequency modulation available from the optical resonant cavity.

FIG. 5 illustrates the individual operating frequency bands of the active laser elements 15 and 19, and the combined line shape which allows the broadband frequency operation of the optical resonant cavity.

In the embodiment shown in FIGS. 1, 2 and 4, the resonant optical cavity is defined with the reflectors displaced a distance from the active laser element 15. It will be obvious to those persons skilled in the art that the reflectors may actually be placed in physical contact with the ends of the laser element. Also, in the embodiments shown, the echelon is shown with four steps. This is not a limitation and any number of steps may be used depending upon the particular application of the device.

To reiterate the advantages of the present invention, the Michaelson echelon reflectors provide a substantially higher Q operation for the laser cavity and making the echelon from an electro-optical material enables a modulating electric field to be applied to the echelon, enabling frequency modulating the output of the laser.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

I claim:

1. A laser system comprising:
   first and second laserable materials;
   first and second pumping means for said first and second laserable materials;
   means shifting the frequency of said second laserable material with respect to that of said first laserable material to maintain a substantially fixed frequency differential between said first and second laserable materials;
   a reflection echelon consisting of an electro-optic material, spaced from said second laserable material;
   a waveguide partially enclosing said reflection echelon, said echelon projecting through one wall portion thereof;
   a resonant cavity including a reflector facing said first laserable material, said cavity further including said reflection echelon and waveguide, said reflector and said waveguide enclosing said first and second laserable materials; and
   means for exciting said waveguide, said excitation varying the optical path length of said reflection echelon to select the frequency produced by the laser system.

2. A laser system as claimed in claim 1 wherein the means for exciting said waveguide comprises a variable oscillator.

3. A laser system as claimed in claim 1 wherein said means shifting the frequency of said laserable material operates to maintain a fixed temperature differential between said first and second laserable materials.

4. A laser system as claimed in claim 1, wherein adjacent steps of said echelon are axially spaced apart a distance equivalent to an integral number of one-half wavelengths of the operating frequency.